United States Patent [19]
Borom et al.

[11] Patent Number: 6,022,594
[45] Date of Patent: Feb. 8, 2000

[54] METHOD TO IMPROVE THE SERVICE LIFE OF ZIRCONIA-BASED COATINGS APPLIED BY PLASMA SPRAY TECHNIQUES, USING UNIFORM COATING PARTICLE SIZE

[75] Inventors: Marcus Preston Borom, Niskayuna; Lawrence Edward Szala, Scotia; Curtis Alan Johnson, Schenectady; Yuk-Chiu Lau, Ballston Lake; Dennis Michael Gray, Delanson, all of N.Y.

[73] Assignee: General Electric Company, Schenectady, N.Y.

[21] Appl. No.: 09/032,511

[22] Filed: Feb. 27, 1998

Related U.S. Application Data

[63] Continuation-in-part of application No. 08/772,454, Dec. 23, 1996, abandoned.

[51] Int. Cl.$^7$ ........................................................ C23C 4/10
[52] U.S. Cl. ............................................ 427/453; 427/454
[58] Field of Search ..................................... 427/453, 454

[56] References Cited

U.S. PATENT DOCUMENTS

| | | | |
|---|---|---|---|
| 4,450,184 | 5/1984 | Longo et al. | 428/402 |
| 5,477,820 | 12/1995 | Rao | 123/193.6 |

*Primary Examiner*—Katherine A. Bareford
*Attorney, Agent, or Firm*—Noreen C. Johnson; Douglas E. Stoner

[57] ABSTRACT

A method for improving the quality of a zirconia-based coating deposited on a metal-based substrate is disclosed. The method comprises the step of plasma-spraying zirconia powder of substantially uniform particle size onto the substrate. The disclosure further relates to an improved powder source material for use in a plasma. The source material is zirconia powder having a uniform particle size, and optionally, a uniform particle density. The use of such a material results in improved thermal barrier coatings for various substrates, such as those found in a turbine engine.

17 Claims, No Drawings

METHOD TO IMPROVE THE SERVICE LIFE OF ZIRCONIA-BASED COATINGS APPLIED BY PLASMA SPRAY TECHNIQUES, USING UNIFORM COATING PARTICLE SIZE

This patent application is a Continuation-in-Part of Application Ser. No. 08/772,454, which was filed on Dec. 23, 1996, now abandoned.

TECHNICAL FIELD

This invention relates generally to coatings technology. More specifically, it involves processes for depositing coatings of improved quality by plasma spray techniques.

BACKGROUND OF THE INVENTION

Metal parts which are exposed to high temperatures are often protected by specially-formulated coatings. As an example, turbine engine parts are often covered by thermal barrier coating (TBC) systems, which include a bond layer and a top layer (i.e., the TBC itself). Most TBC's are ceramic-based, e.g., based on a material like zirconia (zirconium oxide), which is usually chemically stabilized with another material such as yttria. The stabilized zirconia is often applied as a powder in the form of hollow spheres, as described in U.S. Pat. No. 4,450,184 of Longo et al. For a jet engine, these protective coatings are applied to various surfaces, such as turbine engine blades and vanes, combustor liners, and combustor nozzles.

A variety of techniques are available for applying TBC systems. Examples include electron beam physical vapor deposition (EB-PVD), and plasma processes. Each technique has advantages which make it attractive for certain applications. Plasma-spray techniques are the methods of choice in some applications for several reasons. First, they do not usually require the expensive equipment employed in EB-PVD. Furthermore, plasma spray systems are very well suited for coating large parts, with maximum control over the thickness and uniformity of the coatings.

In most plasma spray techniques, an electric arc is typically used to ionize various gasses, such as nitrogen, argon, helium, or hydrogen, to form a plasma operating at temperatures of about 8000° C. or greater. (When the process is carried out in an air environment, it is often referred to as air plasma or "AP".) The gasses are expelled from an annulus (or torch) at high velocity, creating a characteristic thermal plume. Powder material is fed into the plume—often in a direction substantially normal to the direction of the plume. The particles melt in the plasma and are accelerated toward the substrate being coated.

The quality of a coating applied by plasma spray is dependent on a number of factors. Some of these factors include spray distances (gun-to-substrate); selection of the number of spray-passes; powder feed rate, torch power, plasma gas selection; angle of deposition; pre-treatment of the substrate; post-treatment of the applied coating; and the like.

A TBC such as that based on yttria-stabilized zirconia sometimes fails because of the occurrence of cracks which run through the coating in a direction parallel to the substrate interface. The cracks follow interlaminar weaknesses in the coating structure. These sites of weakness often result from poor bonding between layers of deposited particles of molten ceramic powder (commonly referred to as "splats"). The poor bonding may occur because the substrate temperature is too low, so that one splat is quenched before it bonds to a previously-deposited splat. Sometimes, the poor bonding may result because the heat content of the particles reaching the substrate is too low. At other times, the powder particles have not sufficiently melted during their residence time in the plasma, resulting in weakly- bonded, granular material. The granular material (colloquially referred to as "garbage") can be deposited as continuous or discontinuous layers in the coating structure, and can become planes of weakness.

It is thought that th e characteristics of the coa ting particles themselves may have some effect on coating quality. The hollow spheres of stabilized zirconia are often made by the process described in the referenced Longo patent. In brief, the process begins with the production of spherical agglomerates of admixed powders, by way of a spray drying process. The agglomerated powders are held together by a water-soluble binder material such a polyvinyl alcohol. After sieving techniques have been used to reduce the particle size distribution, the spherical agglomerates are passed through a high-temperature, low velocity nitrogen/ hydrogen plasma produced by a conventional plasma gun. The resulting powders are then air-quenched and collected as hollow spheres. It appears that a portion of a typical product mixture is made up of relatively thin-walled hollow spheres, while another portion of the mixture consists of an agglomeration of smaller, spherical agglomerates held together by additional powder.

From this discussion, it is apparent that the quality of a coating deposited by a plasma spray technique may be related to particular process parameters, as well as to the characteristics of the particles which are used to form the coating. Methods for depositing coatings of increased quality continue to be sought after in the relevant industries. These methods should involve the elimination or substantial reduction of delamination cracks in the coating structure, since those types of cracks reduce the service life of the coatings, i.e., they reduce the amount of time the protective coatings can be utilized before they must be replaced or extensively repaired.

Any now method should also be compatible with existing equipment, and with the other process steps involved in depositing protective coatings on metal-based substrates. Moreover, the resulting coatings should have performance characteristics which are equal or superior to those of the current art. This is especially true when the substrate is a high performance article like a turbine engine part.

SUMMARY OF THE INVENTION

The needs discussed above have been substantially satisfied by the discoveries which provide the basis for the present invention. The inventors have discovered that the use of zirconia powder having substantially uniform particle size in a plasma spray process results in higher quality coatings applied on a metal-based substrate. In preferred embodiments, the zirconia particles are in the form of spheres, and they also have a uniform particle density. It is believed that relative uniformity in particle size and density minimizes the number of undesirable particles (e.g. granular or insufficiently-melted particles) which would otherwise contact the substrate and cause problems like delamination failure.

Another embodiment of the present invention relates to an improved process for providing a protective coating on a metal-based substrate by a plasma-spray technique, comprising the step of producing a high-temperature plasma which forms a thermal plume, while feeding zirconia powder (usually entrained in a carrier gas) of substantially uniform particle size into the plume, and directing the high-velocity thermal plume toward the substrate. The protective coatings applied by this process have improved characteristics, such as higher tensile adhesion strength and lower porosity, which make them well-suited for use as a barrier material for various articles, such as a turbine engine component. Details regarding the various embodiments of this invention and its accompanying advantages will be presented in the detailed description which follows.

DETAILED DESCRIPTION OF THE INVENTION

Zirconia is a well-known compound for barrier coatings, and is described, for example, in Kirk-Othmer's *Encyclopedia of Chemical Technology*, 3rd Edition, V. 24, pp. 882–883 (1984). In preferred embodiments, the zirconia is chemically stabilized by being blended with a material such as yttrium oxide, calcium oxide, magnesium oxide, cerium oxide, scandium oxide, or mixtures of any of those materials. In one specific example, zirconia can be blended with about 1% by weight to about 20% by weight yttrium oxide (based on their combined weight), and preferably, from about 3%–10% yttrium oxide.

Most often, the zirconia is used in the form of spheres. Zirconia spheres are commercially available, for example, from METCO, Inc. In preferred embodiments, at least about 30% of the zirconia spheres are hollow. In more preferred embodiments, at least about 50% of the zirconia spheres are hollow, while in some especially preferred embodiments, at least about 70% of the spheres are hollow. As used herein, "hollow" refers to spheres in which the thickness of the shell, which surrounds a void, is less than about 20% of the radius of the sphere. (The thickness of the shell of a hollow zirconia sphere is usually about 0.5 micron to about 10 microns.). Methods for forming zirconia spheres are also known in the art and described, for example, in the above-referenced U.S. Pat. No. 4,450,184, incorporated herein by reference.

The zirconia powder utilized for this invention, in the form of spheres or some other shape, is characterized by a substantially uniform particle size. As used herein, "substantially uniform particle size", according to the broadest definition, specifies a particle size range which excludes substantially all of the coarse particles. This is in marked contrast to zirconia powder used in the prior art, which included substantial amounts (e.g., at least about 20% of the powder) of coarse particles. In the case of zirconia-based powders, "coarse particles" are defined herein as those having a particle size greater than about 65 microns.

Sometimes, uniformity of particle size is also expressed in terms of a particle size distribution which is generally within a selected range relative to the mean particle size. Thus, in some preferred embodiments, the particle size range for zirconia powder of the present invention is within about 20% of the mean particle size. In more preferred embodiments, the particle size range is within about 15% of the mean particle size, while in especially preferred embodiments, the range is within about 10% of the mean particle size. The actual mean particle size usually ranges from about 0.5 micron to about 100 microns, and in preferred embodiments, can range from about 10 microns to about 100 microns. In some especially preferred embodiments, the particle size ranges from about 25 microns to about 70 microns. (As used herein, the terms "average" and "mean" are identical).

Techniques for measuring particle size, and for separating materials according to particle size, are well-known in the art. Examples can be found in Kirk-Othmer's *Encyclopedia of Chemical Technology*, 3rd Edition, Vol. 21, pp. 114–128 (1983). The most widely employed sizing method is sieving (frequently used in the mineral industry), wherein a powder is retained on a series of sieves with different opening dimensions. The process is straightforward, and requires relatively simple equipment. Sieves are available with openings from 5 microns, progressing to various, larger dimensions. The particle mass retained by each sieve is determined by weighing. Each fraction is categorized by the sieve size it passed and the sieve size on which it was retained, and can be segregated in that manner.

Alternatively, sedimentation techniques can be used to determine particle size. This technique generally involves the measurement of the rate at which particles move under gravitational or centrifugal acceleration in a liquid. In liquid phase sedimentation, the particles may initially be distributed uniformly throughout a liquid (as described in the Kirk-Othmer text), or they may be concentrated in a narrow band or layer at the liquid's surface. The movement of the particles may be determined from the accumulation rate at the base of the liquid container, or from the change of concentration over time at other levels.

The size measurement could also be determined by various microscopic techniques, such as optical microscopy. For greater efficiency, this technique would probably be used in conjunction with automated electronic image analyzers. Various standard diameter definitions are usually applied for particle-image measurement when employing microscopic techniques.

Those of ordinary skill in the art understand that various other methods for determining particle size are also known in the art. Examples include the following: x-ray techniques; use of a hydrometer; elutriation (as described below in regard to particle density); centrifuging; sensing-zone methods; and the fluid dynamic techniques described in the referenced Kirk-Othmer text.

While uniformity in particle size has been found to enhance the quality of the plasma-sprayed coating, some uniformity in particle density has also been found to improve the quality of the coating. Thus, in preferred embodiments, at least about 80% of the particles have a density within about 35% (plus or minus) of the average particle density. In more preferred embodiments, at least about 90% of the particles have a density within about 35% of the average particle density. In general, the average particle density for various types of zirconia is in the range of about 1.2 g/cc to about 5.8 g/cc. In preferred embodiments, the range would be about 2 g/cc to about 5.3 g/cc.

Various well-known techniques are useful for separating particles like zirconia, based on density and particle size. Elutriation is a commonly-used process, e.g., in the ore industry, in which a polydisperse mixture of particles can be separated into distinct fractions by means of the combined action of a fluid stream and one or more external force fields. (See *Ullmann's Encyclopedia of Industrial Chemistry*, Fifth Edition; Volume B2, VCH Publisher (1988)).

In general, the various types of elutriation systems are characterized by the flow mechanism under which they operate, e.g., steady counterflow; steady transverse flow, or non-steady flow, as described in Ullmann's. The general processes can be further characterized as vertical or horizontal, or as gas or liquid systems. Many commercial elutriators are available, according to type, e.g., counterflow gravity elutriators, centrifugal elutriators, axial cross-flow elutriators, electromagnetic elutriators, and the like. Commercial brands include the Dorr-Oliver Monosizer™; the Deister Superscalper ™; the Krebs C-H Whirlsizer™; the Humphreys HydroSpec™; the Dorr-Oliver Hydrosizer™; and the Warman Cyclosizer™. Those of ordinary skill in the art will be able to select the particular type of elutriation system most appropriate for zirconia powder, based on various factors, such as the initial particle size distribution of the untreated powder; the volume of material requiring density classification; and the range of particle densities. It should be understood that a combination of sieving and elutriation can be employed to obtain particles which have both the desired size and the desired density characteristics, as described in the examples which follow.

Another aspect of the present invention is directed to an improved process for providing a protective coating on a metal-based substrate by a plasma-spray method. The process depends in large part on the use of zirconia powder having a substantially uniform particle size, and in preferred embodiments, also having a substantially uniform density, as described previously. By proper selection of powder size or powder density, or a combination of these two parameters, substantially all of the particles being delivered to the plasma plume follow essentially the same path or trajectory. This in turn ensures that substantially all of the particles receive the same degree of heating in the plasma.

The metal-based substrate can be any metallic material or alloy which is amenable to protection by a thermal barrier coating. As used herein, "metal-based" refers to substrates which are primarily formed of metal or metal alloys, but which may also include some non-metallic components, e.g., ceramics, intermetallic phases, or intermediate phases. Often, the substrate is a heat-resistant alloy. Many of these materials are referred to as "superalloys", and they typically have an operating temperature of up to about 1000–1150° C. They are described in various references, such as U.S. Pat. Nos. 5,399,313 and 4,116,723, both incorporated herein by reference. High temperature alloys are also generally described in Kirk- Othmer's *Encyclopedia of Chemical Technology*, 3rd Edition, Vol.12, pp. 417–479 (1980), and Vol.15, pp. 787–800 (1981).

Various types of plasma-spray techniques may be utilized in the present invention. They are generally well-known in the art, e.g., see the Kirk-Othmer *Encyclopedia of Chemical Technology*, 3rd Edition, V.15, page 255, and references noted therein. U.S. Pat. Nos. 5,332,598; 5,047,612 (Savkar and Liliquist); and 4,741,286 are instructive in regard to various aspects of plasma spraying, and are incorporated herein by reference. In general, the typical plasma spray techniques involve the formation of a high-temperature plasma, which produces a thermal plume. The zirconia powder is fed into the plume, and the high-velocity plume is directed toward the substrate.

Those of ordinary skill in the plasma spray coating art are familiar with various details which are relevant to applying the coating. Examples of the various steps and process parameters include: Cleaning of the surface prior to deposition; grit blasting to remove oxides and roughen the surface; substrate temperature; and plasma spray parameters such as spray distances (gun-to-substrate); selection of the number of spray-passes; powder feed rate, torch power, plasma gas selection; oxidation control to adjust oxide stoichiometry; angle-of-deposition; post-treatment of the applied coating; and the like.

Special mention is made of several parameters, which may have an appreciable effect on coating quality in some embodiments. For example, torch power may vary in the range of about 15 kilowatts to about 80 kilowatts, and in preferred embodiments, ranges from about 40 kilowatts to about 60 kilowatts. In general, lower power levels within the broad range can be utilized when the zirconia powder has a higher uniform particle size (within the ranges stated above).

The velocity of the zirconia particles flowing into the plasma plume (or plasma "jet") is another parameter which is usually controlled very closely. To briefly review (and as described in several of the references, e.g., U.S. Pat. No. 5,047,612), the typical plasma spray system includes a plasma gun anode which has a nozzle pointed in the direction of the deposit-surface of the substrate being coated. The plasma plume extends in an axial direction between the exit of the plasma gun anode and the substrate surface. Some sort of powder injection means is disposed at a predetermined desired axial location between the anode and the substrate surface. In preferred embodiments, the powder injection means is spaced apart in a radial sense from the plasma plume region, and an injector tube for the powder material is situated in a position so that it can direct the powder into the plasma plume, at an angle substantially normal to the axial direction of the plasma jet.

This method of introducing the powder into the plasma plume is sometimes referred to as cross-flow injection. The powder particles, entrained in a carrier gas, are propelled through the injector and into the plasma plume. The particles are then heated in the plasma and propelled toward the substrate. The heat treatment of all of the particles is a function of the trajectory of the particles through the plasma.

The velocity of the particles as they enter the plasma can also be important in determining their trajectory. In addition to particle size and density, carrier gas flow rates also have a significant role in determining the injection velocity. In general, particle velocities in the range of about 4 meters per second to about 25 meters per second are preferred. Smaller particles of less density would require higher injection velocities (within the ranges taught above), so that these particles would have a momentum which is substantially the same as the momentum of larger particles of greater density. Higher carrier gas flow rates would be utilized to achieve higher injection velocities. Carrier gas flow rates in the range of about 2 scfh to about 20 scfh (and preferably, in the range of about 5 scfh to about 15 scfh) can be used to achieve the desired injection velocities, using conventional plasma spray equipment.

In many instances, a bond coat is used between the substrate and the zirconia-based TBC to enhance adhesion to the substrate. The bond coat is usually formed from a material like "MCrAlY", where "M" represents a metal like iron, nickel, or cobalt. The bond coating may be applied by a variety of conventional techniques, such as PVD; plasma spray or other thermal spray deposition methods such as HVOF (high velocity oxy-fuel), detonation, or wire spray; CVD (chemical vapor deposition); or combinations of plasma spray and CVD techniques. In preferred embodiments, a plasma spray technique, such as that used for the TBC, is employed to deposit the bond coat layer. Usually, the bond coat has a thickness in the range of about 1 mil to about 10 mils, and preferably, in the range of about 3 mils to about 7 mils.

The thickness of the TBC deposited according to the present invention will depend on the end use of the part being coated. Usually, the thickness is in the range of about 5 mils to about 100 mils. In preferred embodiments for end uses such as airfoil components, the thickness is often in the range of about 10 mils to about 30 mils.

Yet another aspect of the present invention is directed to an improved powder source material for use in a plasma spray deposition process. The source material comprises zirconia powder, usually chemically stabilized, having a substantially uniform particle size, as described previously. In preferred embodiments, the particle density is also substantially uniform. Usually, the zirconia is in the form of spheres, and in preferred embodiments, at least about 30% of the spheres are hollow. The use of this powder source material leads to improved protective coatings on metal-based substrates, as set forth herein.

EXAMPLES

The following examples are merely illustrative, and should not be construed to be any sort of limitation on the scope of the claimed invention.

Example 1

Zirconia powder having a wide range of particle size and density was treated for the present invention by various techniques. The powder was commercially available as Metco HOSP 204-NS. Its particle size was in the range of about 1 micron to about 125 microns, and it had a particle density ranging from less than about 1 g/cc to about 5.6 g/cc.

In one procedure, the Metco powder was sieved through U.S. Standard Sieve numbers 200, 230, 325, and 400. The residue retained on each screen was further partitioned, using either flotation in dense liquids or water elutriation. In the first-mentioned technique, various dense liquids were surveyed: carbon tetrachloride, iodomethane, tribromomethane, diiodomethane, thallium formate, and aqueous thallium malonate-thallium formate. Tribromomethane (bromoform), having a density of 2.89 g/cc, was selected for use. Weighed samples were taken from the powder retained on each of the sieves after sieve-separation. The powder was poured into a beaker of bromoform, and the liquid was stirred. The powder was allowed to sink or float. The floating powder was scooped off with a paper filter, washed with carbon tetrachloride, dried, and weighed. The powder that sank was removed from the bromoform by filtration, washed with carbon tetrachloride, dried, and weighed.

The results were reported as weight percent of the original batch used in the sieve analysis. A pycnometer was utilized to determine the density of both the powder retained on each sieve, and the powder fractions that either floated or sank in bromoform. The collected particles were dried and examined microscopically, using optical techniques and/or scanning electron microscopy.

Separation by a water elutriation technique was also performed. As described earlier, elutriation utilizes both the velocity and the viscosity of a flowing liquid to separate powders by a combination of their density and particle size. The separation principle is based on the well-known Stokes' Law, which includes various parameters, such as the sink rate of the particle, its density and radius, the density and viscosity of the fluid, and a gravitational constant.

A water elutriation column was constructed, using a 1.25 meter-long Pyrex glass tube having a 34 mm inner diameter. Flow-regulated water was directed through a copper tube in a rubber stopper placed in the bottom of the glass column. The water then passed through a screen and a collimator made from a bundle of straws (135 mm long×3 mm inner diameter), completely filling the inside diameter of the tube. (The length of the glass tube above the collimator was 1 meter). The water flowed through an exit port near the top of the column. Water flow was adjusted to give a selected, constant linear flow rate in the column.

Zirconia powder that had been sieved to a certain size fraction was further separated by decanting at a variety of water flow rates. By this technique, information regarding both flow rate separation and density distribution for a particular particle size cut could be obtained.

An unsieved zirconia powder sample was also introduced to the elutriator. The decanted liquid was passed at a variety of flow rates through a bank of sieves. By this technique, one could obtain information on particle size distribution as a function of flow rate.

The collected particles were dried and examined microscopically, as described above.

Example 2

In this experiment, thermal barrier coatings based on treated and untreated powder samples were evaluated. For each of the samples described below, TBC layers having a thickness between about 0.010 and 0.020 inch were air plasma-sprayed onto coupons (substrates) made from a nickel-based superalloy, Inconel® 718. Different sets of coupons were used in anticipation of different tests being performed. For microstructural tests, the coupons were rectangular and had dimensions of 1 inch×2 inches, with a thickness of 0.125 inch. For tensile adhesion tests, the coupons were round, having a diameter of 1 inch and a thickness of 0.125 inch. Prior to deposition of the TBC's, the coupons were grit blasted and covered by a plasma deposited bond coat, under standard plasma deposition conditions, at a power setting of 36 kilowatts. The bond coat was made from NiCrAlY, and had a thickness of about 0.006 inch.

Four samples of zirconia powder were used. Sample A (outside the scope of this invention) was an untreated type of zirconia powder, generally in the form of hollow spheres, commercially available from Metco as HOSP 204-NS. The particle sizes ranged from less than 8 microns to about 125 microns. The approximate particle size distribution, by weight, was as follows:

| Percentage of Particles | Mesh Size | Particle Size Range |
| --- | --- | --- |
| 7% | +200 mesh | >74 microns |
| 19% | −200 + 230 mesh | 62–74 microns |
| 28% | −230 + 325 mesh | 44–62 microns |
| 6% | −325 + 400 mesh | 36–44 microns |
| 40% | −400 mesh | <36 microns |

The density of the particles of sample A varied widely, ranging from less than about 1 g/cc to about 5.6 g/cc. In addition to being outside the present invention in regard to particle size uniformity, Sample A also did not meet the density requirements which are present in some embodiments of this invention, since less than 80% of the particles had a density within about 35% of the average particle density.

Sample B was prepared by sieving the material of sample A through a 230 mesh screen, so that substantially all of the remaining zirconia particles had a size range between about 8 microns and about 63 microns, according to the present invention. The mean particle size was about 42 microns. Sample B was outside the scope of embodiments of this invention which rely on substantial uniformity in particle density (i.e., in addition to uniformity in particle size). This is because the density of the particles of sample B varied considerably, ranging from about 1.4 g/cc to about 5.6 g/cc. Less than about 80% of the particles had a density within about 35% of the average particle density.

Sample C was obtained by sieving (−230+325 mesh) standard zirconia material like that of sample A, so that substantially all of the remaining zirconia particles had a size range between about 45 and about 65 microns. The mean particle size was about 54 microns. The powder was then elutriated through the water elutriation device described in Example 1, to achieve an average density of about 5.07 g/cc. At least about 95% of the particles had densities in the range of about 4.1 g/cc to about 5.9 g/cc. This material was within the scope of the present invention, in terms of both particle size and particle density parameters.

Sample D was obtained by sieving (−230+325 mesh) standard zirconia material like that of sample A, so that substantially all of the remaining zirconia particles had a size range between about 45 and about 65 microns. The mean particle size was about 54 microns. The powder was then elutriated through the water elutriation device described in Example 1, to achieve an average density of about 3.02 g/cc. At least about 90% of the particles had densities in the range of about 2.3 g/cc to about 3.8 g/cc. This material was also within the scope of the present invention, in terms of both particle size and particle density parameters.

A commercially-available Metco spray gun was used to deposit the samples on the substrates described above, at a power setting of about 43 kilowatts. The plasma gas system was nitrogen/hydrogen. Carrier gas flow in each instance was 11 scfh. The coatings were post heat-treated after being deposited.

Standard tensile adhesion tests were performed for each sample, and the results are depicted in Table 1. It's clear from the table that samples B, C and D had tensile adhesion values which were superior to those of prior art sample A. The coating of sample D was strong enough to exceed the capabilities of this type of test. Superior tensile adhesion is a good indication of the elimination or substantial reduction of delamination cracks in the coating structure. The superior tensile adhesion characteristics will also increase the service life of the coatings.

TABLE 1

Effect of Powder Size and Density on Tensile Values

| Sample | Particle Size Range* | Elutriation | Density (g/cc) | Tensile Adhesion |
|---|---|---|---|---|
| A | <8–125 microns | Not Done | <1–5.6[a] | 4,000 psi |
| B | 8–63 microns | Not Done | 1.4–5.6[a] | 8,500 psi |
| C | 45–65 microns | Done | 5.07[b] | 10,000 psi |
| D | 45–65 microns | Done | 3.02[b] | 12,000 psi+ |

(a) Density Range
(b) Average Density

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the claimed inventive concept.

All of the patents, articles, and texts mentioned above are incorporated herein by reference.

What is claimed:

1. A method for increasing service life of a zirconia-based coating deposited on a metal-based substrate, comprising the step of plasma-spraying zirconia powder which comprises particles of substantially uniform particle size onto the substrate to form a thermal barrier coating, wherein the zirconia powder is in the form of spheres, and at least about 30% of the spheres are hollow.

2. The method of claim 1, wherein the particles have a range of particle sizes and a mean particle size, and wherein the particle size range is within about 20% of the mean particle size.

3. The method of claim 2, wherein the range of particle size is within about 15% of the mean particle size.

4. The method of claim 2, wherein the mean particle size is in the range of about 0.5 micron to about 100 microns.

5. The method of claim 4, wherein the mean particle size is in the range of about 25 microns to about 70 microns.

6. The method of claim 2, wherein at least about 80% of the particles have a density within about 35% of the average particle density.

7. The method of claim 1, wherein at least about 80% of the particles have a density within about 35% of the average particle density.

8. The method of claim 7, wherein the average particle density is in the range of about 1.2 g/cc to about 5.8 g/cc.

9. The method of claim 7, wherein the particle size and density characteristics are obtained by a technique selected from the group consisting of sieving, elutriation, and combinations of sieving and elutriation.

10. The method of claim 1, wherein at least about 50% of the spheres are hollow.

11. An improved method for providing a thermal barrier coating on a metal-based substrate by a plasma-spray technique, comprising the step of producing a plasma which forms a thermal plume, while feeding zirconia powder of substantially uniform particle size into the plume, and directing the thermal plume toward and onto the substrate to form the thermal barrier coating, wherein the zirconia powder is in the form of spheres, and at least about 30% of the spheres are hollow.

12. The method of claim 11, wherein the particles have a range of particle sizes and a mean particle size, and wherein the particle size range is within about 20% of the mean particle size.

13. The method of claim 12 wherein the mean particle size is in the range of about 0.5 micron to about 100 microns.

14. The method of claim 12, wherein at least about 80% of the particles have a density within about 35% of the average particle density.

15. The method of claim 11, wherein the metal-based substrate is a superalloy.

16. The method of claim 11, wherein the metal-based substrate is a component of a gas turbine engine.

17. The method of claim 11, wherein at least about 50% of the spheres are hollow.

* * * * *